United States Patent
Oh

(10) Patent No.: US 9,832,420 B2
(45) Date of Patent: Nov. 28, 2017

(54) SOURCE DEVICE FOR PROVIDING CONTENTS TO SINK DEVICE AND COMMUNICATION METHOD THEREOF

(75) Inventor: Sung-bo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 756 days.

(21) Appl. No.: 13/480,043

(22) Filed: May 24, 2012

(65) Prior Publication Data

US 2012/0300084 A1 Nov. 29, 2012

(30) Foreign Application Priority Data

May 24, 2011 (KR) ........................ 10-2011-0049054

(51) Int. Cl.
| | |
|---|---|
| G06F 13/14 | (2006.01) |
| H04N 5/775 | (2006.01) |
| H04N 17/00 | (2006.01) |
| H04N 21/41 | (2011.01) |
| H04N 21/4363 | (2011.01) |
| H04N 21/442 | (2011.01) |

(52) U.S. Cl.
CPC ........... *H04N 5/775* (2013.01); *H04N 17/004* (2013.01); *H04N 21/4122* (2013.01); *H04N 21/43635* (2013.01); *H04N 21/44231* (2013.01)

(58) Field of Classification Search
None
See application file for complete search history.

(56) References Cited

U.S. PATENT DOCUMENTS

| | | | |
|---|---|---|---|
| 7,359,511 B2 | 4/2008 | Matsuzaki et al. | |
| 7,761,709 B2 | 7/2010 | Choi | |
| 7,797,536 B1* | 9/2010 | Lyle ...................... | H04L 9/0844 380/2 |
| 8,190,886 B2 | 5/2012 | Suzuki | |
| 8,713,213 B1* | 4/2014 | Yildiz .................. | G06F 13/385 710/15 |
| 8,744,081 B2 | 6/2014 | Christison | |

(Continued)

FOREIGN PATENT DOCUMENTS

| | | |
|---|---|---|
| CN | 1428047 A | 7/2003 |
| CN | 1764907 A | 4/2006 |

(Continued)

OTHER PUBLICATIONS

Communication dated Jan. 7, 2013 from the European Patent Office in counterpart European application No. 12161791.4.

(Continued)

*Primary Examiner* — Ilwoo Park
(74) *Attorney, Agent, or Firm* — Sughrue Mion, PLLC

(57) ABSTRACT

A source device that provides contents to a sink device and a communication method thereof are provided. The communication method of the source device includes: transmitting a communication signal including a High-bandwidth Digital Content Protection (HDCP) signal to the sink device; determining a communication status with the sink device using an HDCP communication result received from the sink device; and adjusting the communication signal according to the determined communication status. Therefore, the communication method can provide a user with optimized contents.

14 Claims, 8 Drawing Sheets

(56) References Cited

U.S. PATENT DOCUMENTS

| | | |
|---|---|---|
| 2003/0145336 A1 | 7/2003 | Matsuzaki et al. |
| 2005/0225547 A1 | 10/2005 | Choi |
| 2006/0074682 A1* | 4/2006 | Chou ............... H04N 17/004 704/270 |
| 2006/0171391 A1 | 8/2006 | Suzuki |
| 2007/0055876 A1* | 3/2007 | Choi ............... G06F 13/4081 713/170 |
| 2007/0162738 A1 | 7/2007 | Kim |
| 2008/0050097 A1* | 2/2008 | Takamori ............ G09G 5/006 386/263 |
| 2008/0115013 A1 | 5/2008 | Jung et al. |
| 2008/0180518 A1 | 7/2008 | Miyazaki |
| 2008/0195923 A1 | 8/2008 | Masumori |
| 2008/0232588 A1 | 9/2008 | Christison |
| 2012/0206656 A1* | 8/2012 | Shintani ...................... 348/708 |

FOREIGN PATENT DOCUMENTS

| | | |
|---|---|---|
| CN | 101001353 A | 7/2007 |
| CN | 101715634 A | 5/2010 |
| EP | 1793602 A2 | 6/2007 |
| EP | 2302921 A1 | 3/2011 |
| JP | 2008-193168 A | 8/2008 |
| JP | 200927588 A | 2/2009 |
| JP | 2011-160245 A * | 8/2011 |
| KR | 10-2007-0027222 A | 3/2007 |
| WO | 2006043547 A1 | 4/2006 |

OTHER PUBLICATIONS

"Digital Visual Interface DVI", Digital Visual Interface DVI, XX, XX, Revision 1.0, 2 Apr. 1999, pp. 1-76.

"High-Bandwidth Digital Content Protection System, Revision 1.0", XX, XX, Feb. 17, 2000, pp. 1-60.

Eidson et al., "30.2: HDMI: High-Definition Multimedia Interface", 2003 Sid International Symposium Digest of Technical Papers, Baltimore, MD, May 20-22, 2003, pp. 1024-1027.

Communication dated May 10, 2016 issued by the Japanese Patent Office in counterpart Japanese Patent Application No. 2012-117352.

Communication dated Jun. 24, 2016 issued by the European Patent Office in counterpart European Patent Application No. 12161791.4.

Communication dated Sep. 12, 2016 issued by the Korean Intellectual Property office in counterpart Korean Patent Application No. 10-2011-0049054.

Communication dated Sep. 12, 2016 issued by the State Intellectual Property Office of PR China in counterpart Chinese Patent Application No. 201210164674.6.

Communication dated Apr. 13, 2017, issued by the State Intellectual Property Office of the People's Republic of China in counterpart Chinese Application No. 201210164674.6.

* cited by examiner

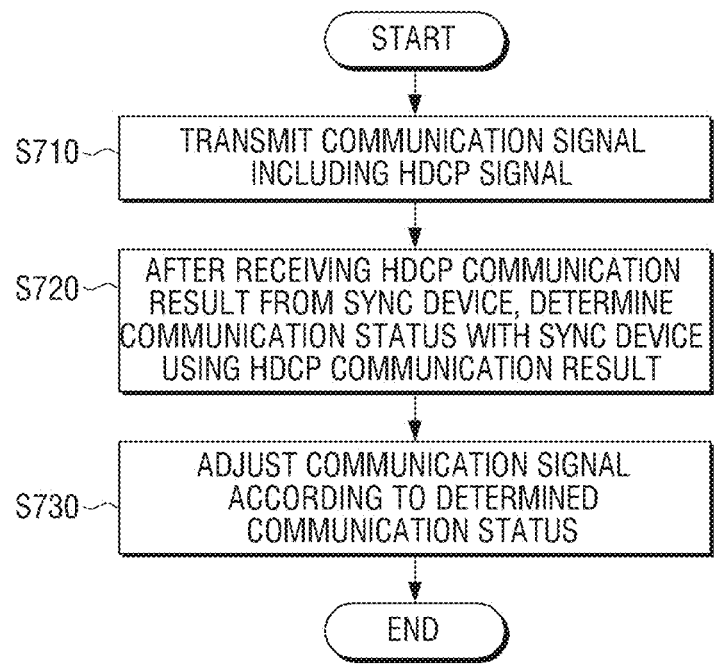

SOURCE DEVICE FOR PROVIDING CONTENTS TO SINK DEVICE AND COMMUNICATION METHOD THEREOF

CROSS-REFERENCE TO RELATED APPLICATIONS

This application claims priority from Korean Patent Application No. 10-2011-0049054, filed May 24, 2011 in the Korean Intellectual Property Office, the disclosure of which is incorporated herein by reference in its entirety.

BACKGROUND

1. Field

Apparatuses and methods consistent with exemplary embodiments relate to a source device and a communication method thereof, and more particularly, to a source device for providing contents to a sink device using a High-Definition Multimedia Interface (HDMI) or a Digital Visual Interface (DVI) communication interface and a communication method thereof.

2. Description of the Related Art

Recently, for providing high-definition contents, a High Definition Multimedia Interface (HDMI) and a Digital Visual Interface (DVI) communication have been widely used. In particular, the HDMI or DVI communication adds a High-bandwidth Digital Content Protection (HDCP) signal to the contents and provides the contents in order to protect the contents. Generally, in the HDMI or DVI communication, the HDCP signal transmits content protection information and control signals through a Display Data Channel (DDC) line and a Transition Minimized Differential Signaling (TMDS) line.

On the other hand, if a frequency characteristic of a communication signal is deteriorated due to a long length of an HDMI cable or other causes, communication between the source device and the sink device is not smooth so that communication failure occurs. As a result, abnormal pictures and sounds including noise are output.

In other words, if the frequency characteristic of the communication signal is deteriorated, voltage levels of digital signals for representing "1" and "0" of the digital signal are not accurately transmitted so that the source device cannot provide normal contents to the sink device.

Accordingly, for providing normal contents, a solution that determines a communication status between the source device and the sink device and, if the status thereof indicates a communication failure, improves the communication status is required.

SUMMARY

The present disclosure has been developed in order to overcome the above drawbacks and other problems associated with the related art arrangement. An aspect of the present disclosure is to provide a source device that determines a communication status using a result of HDCP communication and adjusts a communication signal corresponding to the communication status and a communication method thereof.

According to an aspect of an exemplary embodiment, there is provided a communication method of a source device that provides contents to a sink device, the communication method including: transmitting a communication signal including a High-bandwidth Digital Content Protection (HDCP) signal to the sink device; determining a communication status with the sink device using an HDCP communication result received from the sink device; and adjusting the communication signal according to the determined communication status.

The determining the communication status with the sink device may include comparing a decoding value of the HDCP signal transmitted from the sink device with a decoding value generated in the source device to determine the communication status with the sink device; and the adjusting the communication signal comprises, if the decoding value of the HDCP signal transmitted from the sink device and the decoding value generated in the source device are not the same according to the determining, adjusting the communication signal.

The adjusting the communication signal may include adjusting a waveform of the communication signal if the decoding value of the HDCP signal transmitted from the sink device and the decoding value generated in the source device are not the same according to the determining.

The adjusting the communication signal may include at least one of heightening a peak to peak of the communication signal, decreasing a rising time and a falling time of the communication signal, and increasing or decreasing jitter for optimization of electrical characteristics of the communication signal.

The communication method may include transmitting the adjusted communication signal to the sink device and determining the communication status with the sink device using another HDCP communication result transmitted from the sink device; and if it is determined that the other HDCP communication result is a failure result, changing a frequency of the communication signal.

The changing the frequency of the communication signal may include decreasing a bit depth of picture data included in the contents.

The changing the frequency of the communication signal may include decreasing an output resolution of picture data included in the contents.

The communication signal may include a Transition Minimized Differential Signaling (TMDS) signal.

The transmitting the communication signal may include transmitting the communication signal using any one of a High Definition Multimedia Interface (HDMI) and a Digital Visual Interface (DVI).

According to an aspect of another exemplary embodiment, there is provided a source device that provides contents to a sink device, the source device including: a communicating portion which communicates with the sink device; and a controller which controls the communicating portion to transmit a communication signal including a High-bandwidth Digital Content Protection (HDCP) signal to the sink device, determines a communication status with the sink device using an HDCP communication result received from the sink device, and adjusts the communication signal according to the determined communication status.

The controller may compare a decoding value of the HDCP signal transmitted from the sink device and a decoding value generated in the source device to determine the communication status with the sink device, and, if the decoding value of the HDCP signal transmitted from the sink device and the decoding value generated in the source device are not the same according to the determining, may adjust the communication signal.

If the decoding value of the HDCP signal transmitted from the sink device and the decoding value generated in the source device are not the same according to the determining, the controller may adjust a waveform of the communication signal.

The controller may adjust the waveform of the communication signal so that at least one of a peak to peak of the communication signal is heightened, a rising time and a falling time of the communication signal are decreased, and jitter is increased or decreased for optimization of electrical characteristics of the communication signal.

The controller may control the communicating portion to transmit the adjusted communication signal to the sink device, determine the communication status with the sink device using another HDCP communication result transmitted from the sink device, and if it is determined that the other HDCP communication result is a failure result, the controller may change a frequency of the communication signal.

The controller may decrease a bit depth of picture data included in the contents to change the frequency of the communication signal.

The controller may decrease an output resolution of picture data included in the contents to change the frequency of the communication signal.

The communication signal may include a Transition Minimized Differential Signaling (TMDS) signal.

The communicating portion may use any one of a High Definition Multimedia Interface (HDMI) and a Digital Visual Interface (DVI).

According to an aspect of another exemplary embodiment, there is provided a communication method of a sink device that receives contents from a source device, the communication method including: receiving, from the source device, a communication signal including a High-bandwidth Digital Content Protection (HDCP) signal; and transmitting, to the source device, an HDCP communication result, wherein the HDCP communication result includes a decoding value of the HDCP signal generated in the sink device.

Other objects, advantages and salient features of the present disclosure will become apparent from the following detailed description, which, taken in conjunction with the annexed drawings, discloses exemplary embodiments.

BRIEF DESCRIPTION OF THE DRAWINGS

These and/or other aspects and advantages of the present disclosure will become apparent and more readily appreciated from the following description of exemplary embodiments, taken in conjunction with the accompanying drawings of which:

FIGS. 6 and 7 are flow charts illustrating communication methods of a source device according to one or more exemplary embodiments.

Throughout the drawings, like reference numerals will be understood to refer to like parts, components and structures.

DETAILED DESCRIPTION OF EXEMPLARY EMBODIMENTS

Hereinafter, certain exemplary embodiments of the present disclosure will be described in detail with reference to the accompanying drawings. Hereinafter, it is understood that expressions such as "at least one of," when preceding a list of elements, modify the entire list of elements and do not modify the individual elements of the list.

Figure 1:
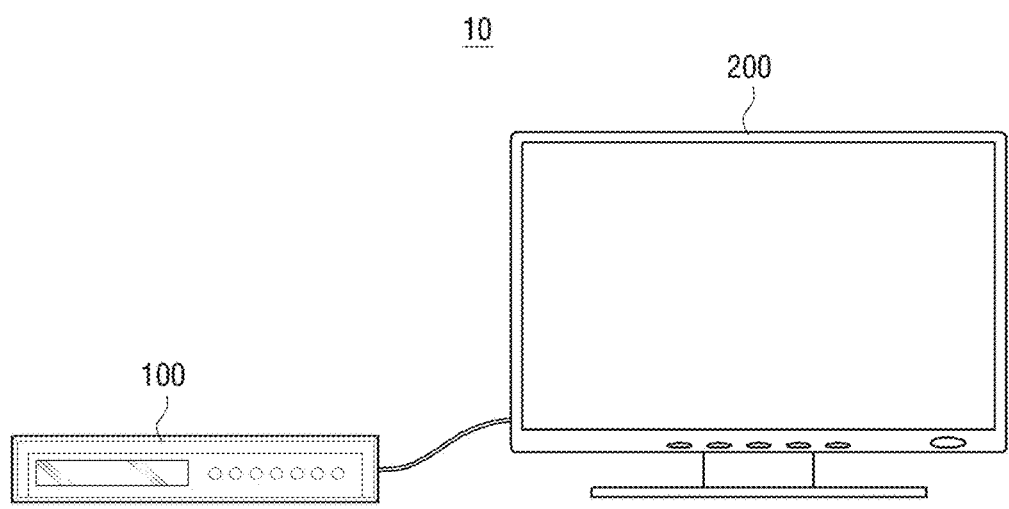
FIG. 1 is a view illustrating a communication system including a source device and a sink device according to an exemplary embodiment.

FIG. 1 is a view illustrating a communication system 10 including a source device 100 and a sink device 200 according to an exemplary embodiment.

The source device 100 and the sink device 200 of the communication system 10 are connected to communicate with each other using at least one of a High Definition Multimedia Interface (HDMI) and a Digital Visual Interface (DVI).

The source device 100 is an apparatus that provides the sink device 200 with contents including picture data and audio data. The source device 100 may be a Digital Versatile Disk (DVD) player as illustrated in FIG. 1. However, this is only one example and other exemplary embodiments can be applied to other source devices 100, such as a set top box, a computer, etc.

The sink device 200 is an apparatus that outputs the contents received from the source device 100. As illustrated in FIG. 1, the sink device 200 may be a TV. However, this is only one example, and other exemplary embodiments can be applied to other sink devices 200 such as a monitor, a projection TV, a notebook PC, etc.

Hereinafter, detailed configurations of the source device 100 and sink device 200 are explained in detail.

Figure 2:
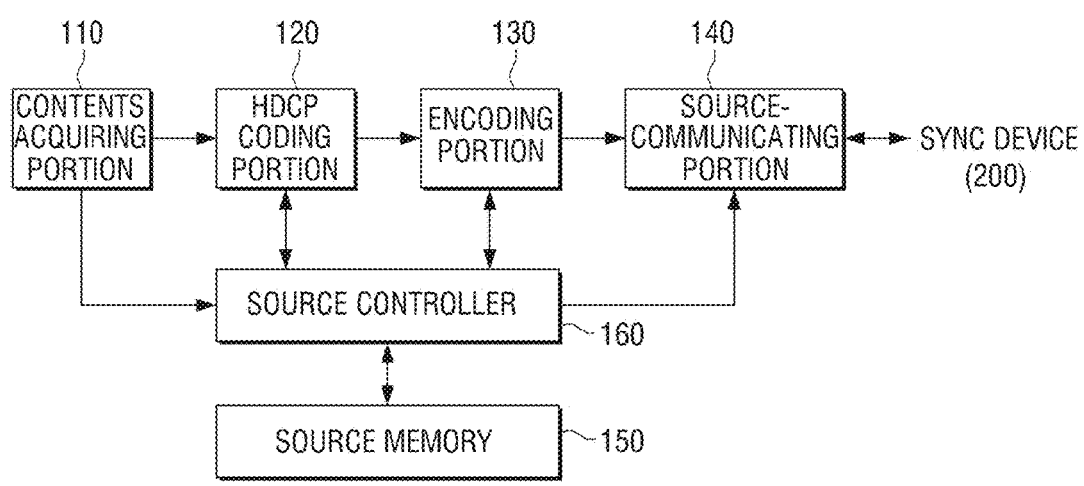
FIG. 2 is a block diagram illustrating a source device according to an exemplary embodiment.

FIG. 2 illustrates a block diagram of a source device 100 according to an exemplary embodiment. As illustrated in FIG. 2, the source device 100 may include a contents-acquiring portion 110, an HDCP coding portion 120, an encoding portion 130, a source-communicating portion 140, a source memory 150, and a source controller 160.

The contents-acquiring portion 110 acquires contents from a contents-source and provides the contents to the HDCP coding portion 120. A method by which the contents-acquiring portion 110 acquires the contents depends on a type of the source device 100.

For example, if the source device 100 is a set top box, the contents-acquiring portion 110 acquires contents by a method to receive the contents from broadcasting stations through a cable or an antenna. If the source device 100 is a DVD player, the contents-acquiring portion 110 reads a DVD and acquires the contents.

The HDCP coding portion 120 performs an HDCP coding task with respect to the contents that are output from the contents-acquiring portion 110 using an HDCP coding module.

Figure 3:
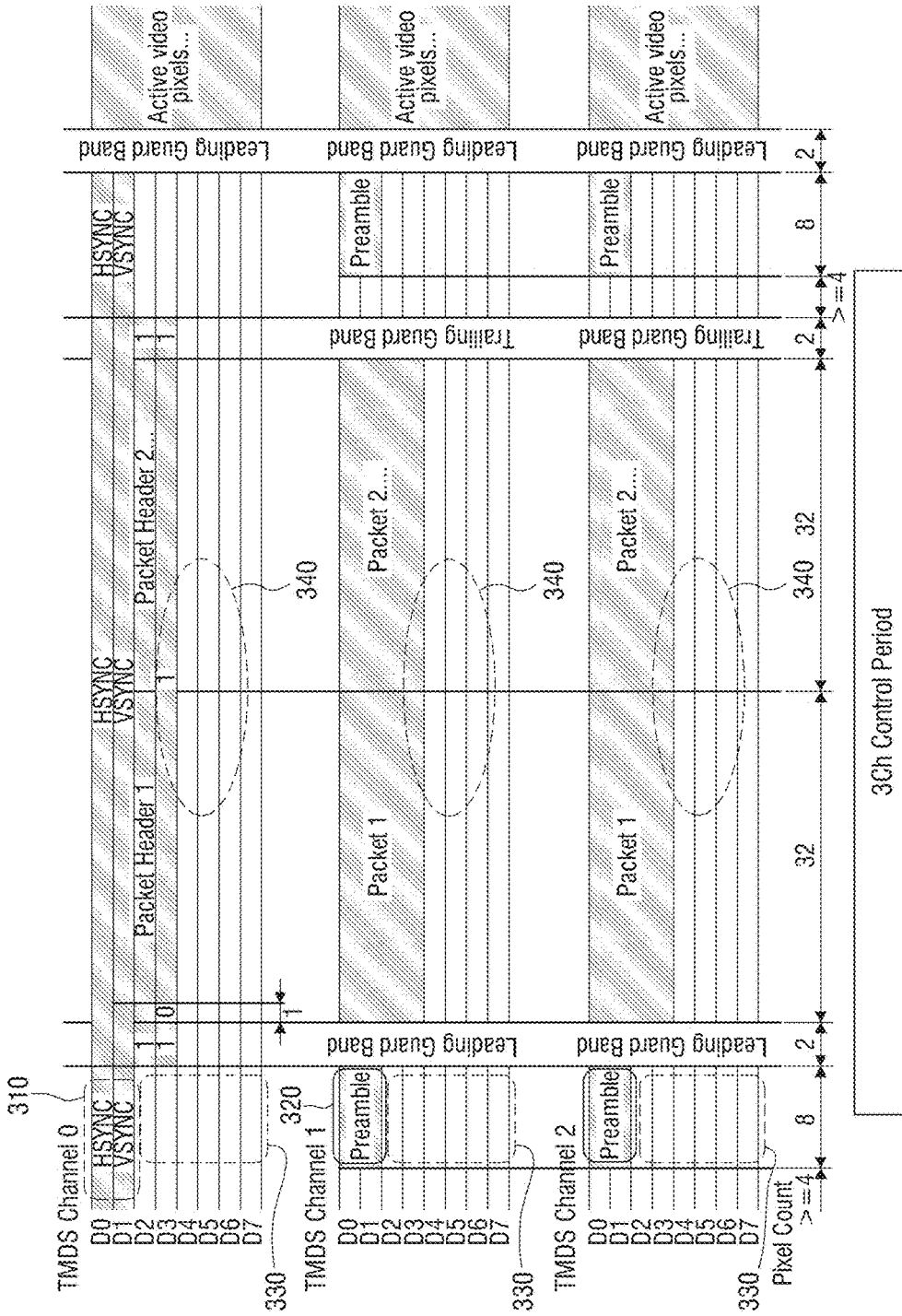
FIG. 3 illustrates a configuration of a TMDS signal according to an exemplary embodiment.

The encoding portion 130 adds the HDCP signal, which is coded in the HDCP coding portion 120, and other information to generate a TMDS signal. FIG. 3 illustrates a configuration of a TMDS signal according to an exemplary embodiment. As illustrated in FIG. 3, the TMDS signal includes three channels. "A TMDS channel 0" includes a first region 310 in which a vertical sync signal and a horizontal sync signal are placed at the beginning of the signal, a second region 330 in which audio data packets are placed and a third region 340 in which video data packets are placed. Each of "TMDS channel 1" and "TMDS channel 2"

includes a fourth region 320 in which an HDCP signal is placed at the beginning of the signal, the second region 330 in which audio data packets are placed and the third region 340 in which video data packets are placed.

The encoding portion 130 can generate frames by a predetermined time interval, for example, every one second.

The source-communicating portion 140 transmits the TMDS signal generated by the encoding portion 130 to the sink device 200. Also, the source-communicating portion 140 receives an HDCP communication result from the sink device 200. The HDCP communication result represents a decoding value Rn of an HDCP signal generated in the sink device 200.

The source-communicating portion 140 can communicate with the sink device 200 using any of the HDMI interface and DVI interface.

The source memory 150 stores various data and information for controlling the source device 100. Specially, the source memory 150 stores information with respect to A Key Selection Vector (AKSV) and a key value An for generating a value of Rn'.

The source controller 160 controls overall motion of the source device 100 according to an input of a user. Specially, the source controller 160 controls the source-communicating portion 140 to transmit the TMDS signal with an HDCP signal to the sink device 200.

The source controller 160 determines a communication status between the source device 100 and the sink device 200 using an HDCP communication result received from the sink device 200. In detail, after the sink device 200 receives the TMDS signal, the sink device 200 generates Rn using a key value An of the HDCP signal that is included in the received TMDS signal and a pre-stored B Key Selection Vector (BKSV). Then, the sink device 200 transmits the generated Rn to the source device 100.

After receiving Rn from the sink device 200, the source controller 160 compares Rn', which is generated based on AKSV and An that are stored in the source memory 150, and Rn, which is transmitted from the sink device 200, to determine if Rn' and Rn are the same.

If Rn' is the same as Rn, that is, if Rn'=Rn, the source controller 160 determines that the communication status between the source device 100 and the sink device 200 is normal, maintains the current communication status, and controls the source-communicating portion 140 to communicate with the sink device 200 accordingly.

However, if Rn' is not the same as Rn, that is, if Rn'≠Rn, the source controller 160 determines that the communication status between the source device 100 and the sink device 200 is a failure status. At this time, causes by which the communication status is the failure status may include that an unverified sink device 200 performs communication with the source device 100, and that the frequency characteristic of the TMDS signal is deteriorated by an electric resistance of a cable due to the length of the cable. In addition, if the frequency characteristic of the TMDS signal is deteriorated by other causes, the source controller 160 may determine the communication status between the source device 100 and sink device 200 is the failure status.

Accordingly, for overcoming communication failure caused, by way of example, by deterioration of the frequency characteristic of the TMDS signal, the source controller 160 adjusts the TMDS signal.

Figure 4A:
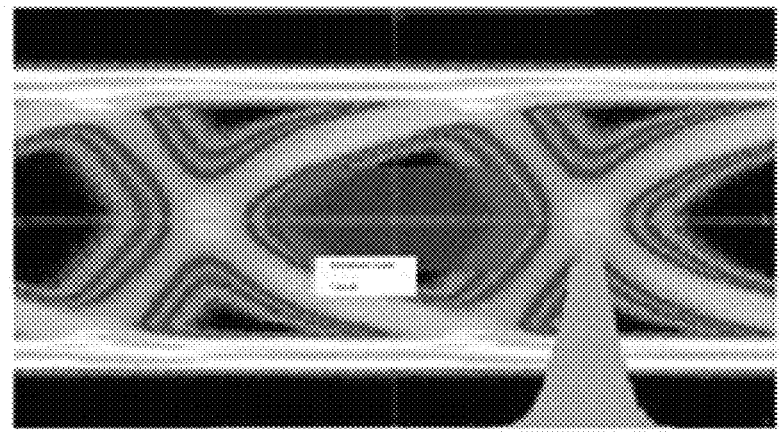
FIG. 4A illustrates eye patterns of a TMDS signal according to an exemplary embodiment before a communication signal is improved and FIG. 4B illustrates eye patterns of the TMDS signal according to an exemplary embodiment after the communication signal is improved.

In detail, if it is determined that the communication status is the failure status, the source controller 160 may adjust a waveform of the TMDS signal. In further detail, as illustrated in FIG. 4A, if the frequency characteristic of the TMDS signal is deteriorated, the frequency does not reach the peak thereof or the frequency period is lengthened.

Figure 4B:
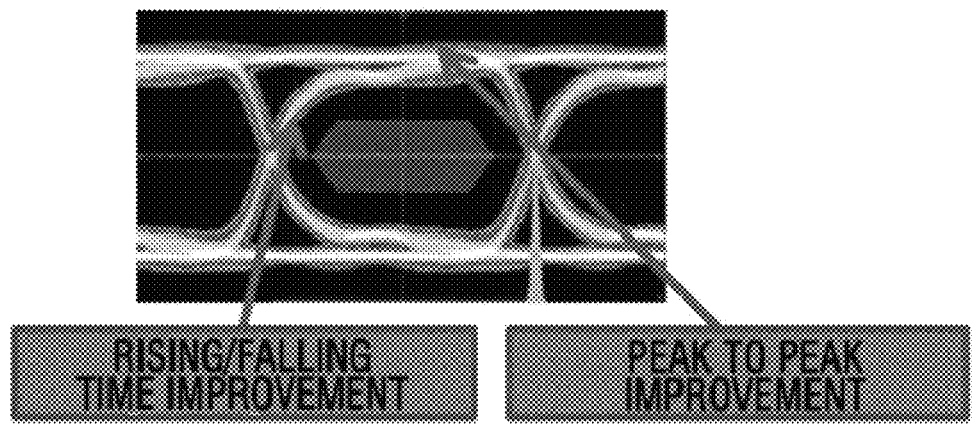

At this time, the source controller 160 may adjust the TMDS signal so that the peak-to-peak thereof is heightened and the rising time and falling time thereof are decreased. Therefore, as illustrated in FIG. 4B, the source controller 160 may adjust the deteriorated frequency characteristic so that the TMDS signal reaches the peak thereof and the period of the frequency is decreased.

However, this is only one example, and other exemplary embodiments are not limited thereto. For example, according to another exemplary embodiment, the source controller 160 can adjust the waveform of the communication signal so as to increase or decrease jitter, etc., in order to optimize the electric characteristic of signals.

According to the above-described method, optimized contents can be provided to a user by adjusting the electric characteristic of the TMDS signal without affecting picture data and audio data included in the TMDS signal.

After adjusting the TMDS signal by the above-described method, the source controller 160 controls the source-communicating portion 140 to transmit the adjusted TMDS signal to the sink device 200.

Then, the source controller 160 determines the communication status between the source device 100 and the sink device 200 using an HDCP communication result that is again received from the sink device 200. A method for determining the communication status with the sink device 200 using the HDCP communication result is the same as the above-described method. Therefore, a description thereof will be omitted.

If it is again determined that the communication is the failure status, the source controller 160 can adjust a bit depth of picture data included in the TMDS signal. For example, the source controller 160 may adjust the picture data that is output in 12 bits per color (RGB or YCbCr) into the picture data that is output in 10 bits or 8 bits per color.

Also, the source controller 160 may perform the method for adjusting the bit depth several times, thereby providing pictures having optimal quality to a user in a normal communication status. For example, after the source controller 160 adjusts the picture data that is output in 12 bits into picture data that is output in 10 bits, and then into picture data that is output in 8 bits, the source controller 160 can determine the communication status thereof.

The source controller 160 can provide contents in a normal communication status by adjusting the bit depth so that the frequency of the TMDS signal is adjusted as described above.

Also, if the communication failure is sustained despite performing frequency adjustment by adjusting the bit depth, the source controller 160 may adjust an output resolution of the picture data. For example, the source controller 160 may adjust picture data having an output resolution of 1080P/8 bit and a clock frequency of 148.35 MHz into picture data having an output resolution of 1080i/8 bit and a clock frequency of 74.176 MHz.

As described above, the source controller 160 can provide contents having less image quality to the sink device 200 in a normal communication status by adjusting the output resolution so that the frequency of the TMDS signal is adjusted.

Figure 5:
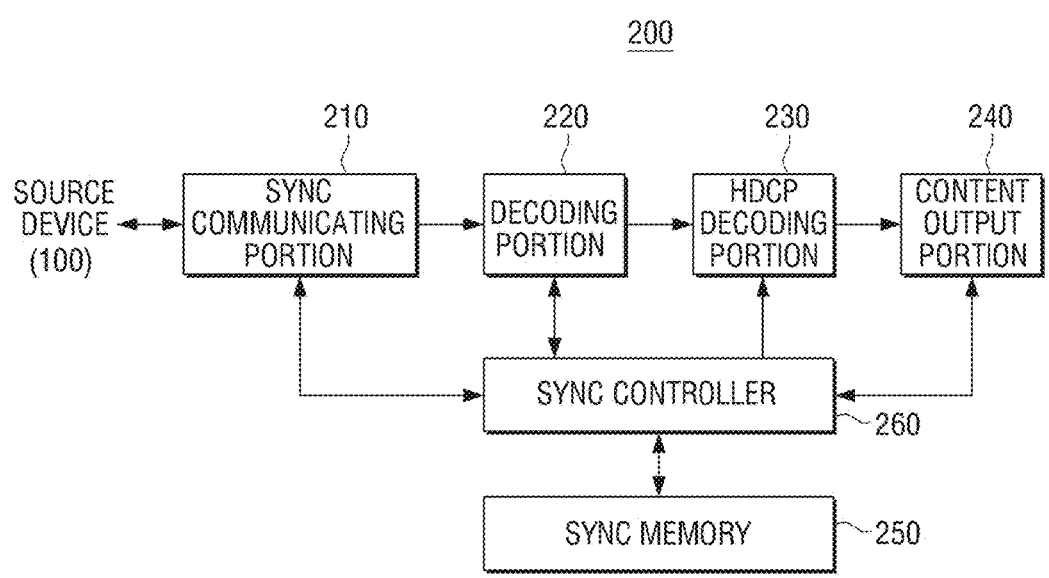
FIG. 5 is a block diagram illustrating a sink device according to an exemplary embodiment.

FIG. 5 is a block diagram illustrating a sink device 200 according to an exemplary embodiment. As illustrated in FIG. 5, the sink device 200 may include a sink communicating portion 210, a decoding portion 220, an HDCP decoding portion 230, a content output portion 240, a sink-memory 250 and a sink controller 260.

The sink-communicating portion 210 receives the TMDS signal that is transmitted by the source-communicating portion 140 of the source device 100 and transmits the received TMDS signal to the decoding portion 220. Also, the sink communicating portion 210 transmits the HDCP communication result that is generated by the HDCP decoding portion 230 of the sink device 200 to the source device 100. The HDCP communication result represents a decoding value Rn of an HDCP signal generated by the sink device 200.

Here, the sink communicating portion 210 can communicate with the source device 100 using any of the HDMI interface and DVI interface like the source-communicating portion 140.

The decoding portion 220 decodes the TMDS signal which is received from the source device 100 through the sink communicating portion 210.

The HDCP decoding portion 230 uses an HDCP decoding module to decode a coded HDCP signal which is applied by the decoding portion 220. In detail, the HDCP decoding portion 230 uses a key value An of the HDCP signal, which is included in the TMDS signal received from the source device 100, and a pre-stored B Key Selection Vector (BKSV) to decode the HDCP signal, and generates Rn accordingly.

The content output portion 240 provides a user with picture data and audio data which are included in the TMDS signal. A method in which the content output portion 240 outputs the contents depends on the type of the sink device 200.

The sink-memory 250 stores various data and information for controlling the sink device 200. Specially, the sink-memory 250 stores information with respect to the BKSV for generating an Rn value.

The sink controller 260 controls overall motion of the sink device 200 according to an operation of a user. Specially, the sink controller 260 controls the sink-communicating portion 210 to transmit the decoding value Rn of the HDCP communicating result, which is generated in the HDCP decoding portion 230, to the source device 100.

Accordingly, the source device 100 uses the HDCP communicating result transmitted from the sink device 200 to determine the communication status with the sink device 200 and can provide a user with optimized contents.

Hereinafter, communication methods of the source device 100 according to one or more exemplary embodiments will be explained with reference to FIGS. 6 and 7.

Figure 6:
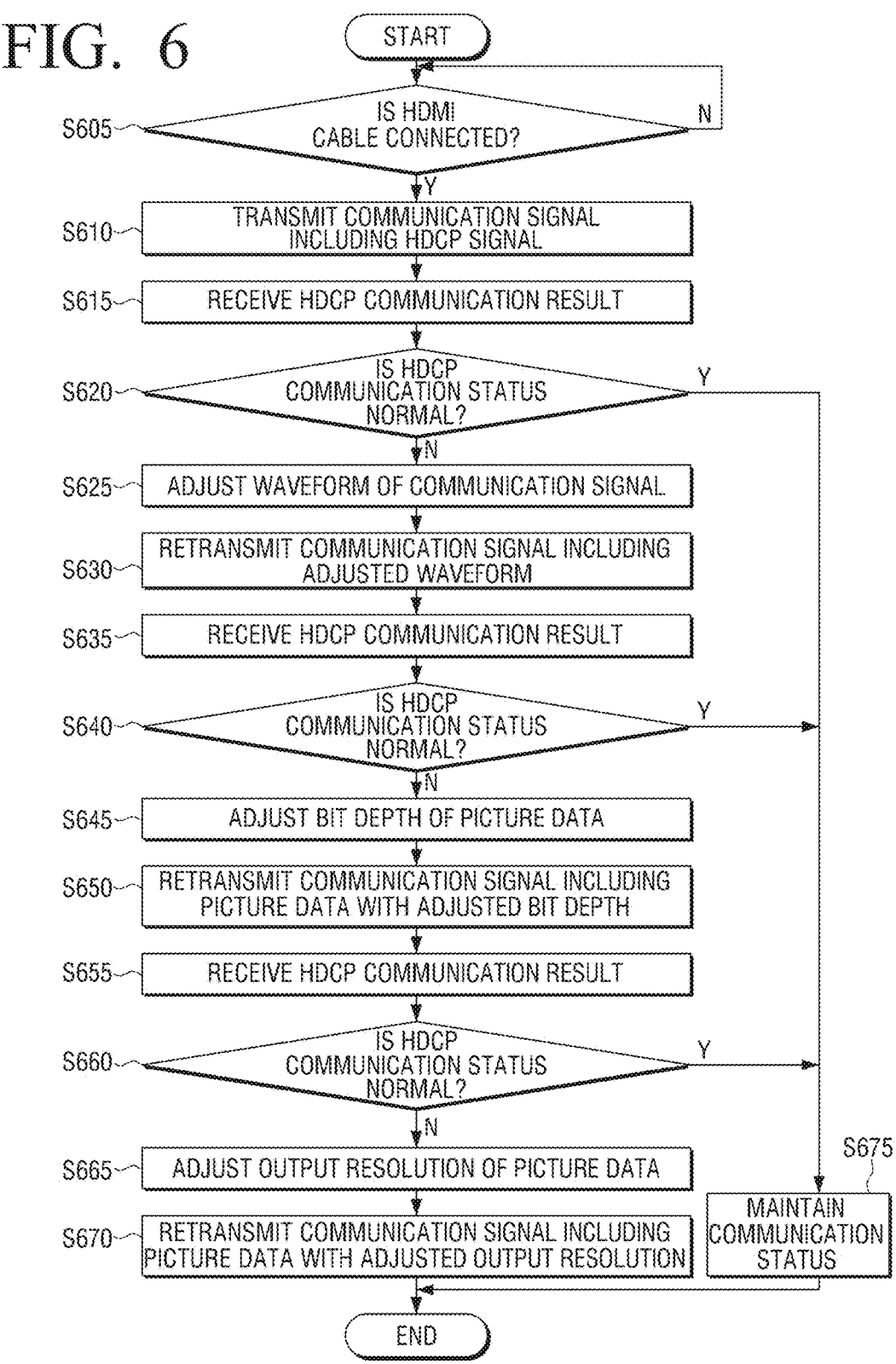

FIG. 6 is a flow chart illustrating a communication method of a source device 100 according to an exemplary embodiment.

The source device 100 determines whether an HDMI cable is connected to the sink device 200 (operation S605).

If it is determined that the sink device 200 and the HDMI cable are connected (operation S605-Y), the source device 100 transmits a communication signal having the HDCP signal (operation S610). The communication signal may be a TMDS signal.

After the sink device 200 decodes the transmitted HDCP signal and transmits an HDCP communication result, the source device 100 receives the transmitted HDCP communication result (operation S615). The HDCP communication result represents Rn which the sink device 200 decoded using a key value An of the received HDCP signal and the pre-stored BKSV.

The source device 100 uses the received HDCP communication result to determine whether the HDCP communication status is normal (operation S620). In detail, when receiving Rn from the sink device 200, the source device 100 compares Rn', which is generated based on the pre-stored AKSV and An, and Rn, which is transmitted from the sink device 200, to determine if Rn and Rn' are the same.

If Rn'=Rn, the source device 100 determines that the HDCP communication is normal, thereby determining the communication status between the source device 100 and the sink device 200 is normal (operation S620-Y). If it is determined that the communication status is normal, the source device 100 maintains the communication status (operation S675).

However, if Rn'≠Rn, the source device 100 determines that the HDCP communication has failed, thereby determining the communication status between the source device 100 and the sink device 200 as a failure status (operation S620-N).

If it is determined that the communication status is the failure status (operation S620-N), the source device 100 adjusts a waveform of the communication signal (operation S625). In detail, the source device 100 can adjust the communication signal to heighten the peak-to-peak thereof and to decrease the rising time and falling time thereof. In other words, the source device 100 adjusts the communication signal having a deteriorated frequency characteristic to reach a peak thereof and decreases a period of the frequency so as to adjust the deteriorated frequency characteristic.

According to the above-described method, optimized contents can be provided to a user by adjusting only an electric characteristic of the communication signal without affecting picture data and audio data included in the communication signal.

After the waveform of the communication signal is adjusted (operation S625), the source device 100 again transmits the communication signal having the adjusted waveform to the sink device 200 (operation S630). Then, the source device 100 again receives an HDCP communication result from the sink device 200 (operation S635). After receiving the HDCP communication result, the source device 100 determines whether the HDCP communication status is normal as described in operation S620 (operation S640).

If the HDCP communication status is normal (operation S640-Y), the source device 100 determines the communication status between the source device 100 and the sink device 200 is normal, thereby maintaining the current communication status (operation S675).

However, if the HDCP communication status is again the failure status (operation S640-N), the source device 100 determines the communication status between the source device 100 and the sink device 200 is the failure status, thereby adjusting a bit depth of the picture data (operation S645). At this time, the bit depth corresponds to a bit number representing each color (RGB or YCbCr) of the picture data. For example, the source device 100 can adjust the picture data that is output in 12 bits per color (RGB or YCbCr) into picture data that is output in 8 bits per color.

After the bit depth of the picture data is adjusted, the source device 100 again transmits the communication signal including the picture data with the adjusted bit depth (operation S650). Then, the source device 100 again receives the HDCP communication result from the sink device 200 (operation S655).

After receiving the HDCP communication result, the source device 100 determines whether the HDCP communication status is normal as described in operation S620 (operation S660).

If the HDCP communication status is normal (operation S660-Y), the source device 100 determines the communication status between the source device 100 and the sink device 200 is normal, thereby maintaining the current communication status (operation S675).

However, if the HDCP communication status is again the failure status (operation S660-Y), the source device 100 determines the communication status between the source device 100 and the sink device 200 is the failure status, thereby adjusting an output resolution of the picture data. For example, the source device 100 may adjust picture data having an output resolution of 1080P/8 bit and a clock frequency of 148.35 MHz into picture data having an output resolution of 1080i/8 bit and a clock frequency of 74.176 MHz.

After the output resolution of the picture data is adjusted, the source device 100 again transmits the communication signal including the picture data with the adjusted output resolution (operation S670). Accordingly, transmission of the picture data having the adjusted output resolution may allow the communication failure caused by deterioration of the frequency characteristic to be overcome.

As described above, since the source device 100 determines the communication status between the source device 100 and the sink device 200 using the HDCP communication result and automatically adjusts the communication environment corresponding to the determination result, optimized contents can be provided to a user.

FIG. 7 is a flow chart for explaining a communication method of the source device 100 according to an exemplary embodiment.

First, the source device 100 transmits a communication signal including a HDCP signal to the sink device 200 (operation S710). At this time, the communication signal may be a TMDS signal. The source device 100 uses a DVI interface or an HDMI interface to communicate with the sink device 200.

After receiving the HDCP communication result from the sink device 200, the source device 100 uses the HDCP communication result to determine the communication status with the sink device 200 (operation S720). Detailed explanations thereof are the same as the explanations with respect to FIGS. 2 and 6. Therefore, the detailed explanations will be omitted herein.

The source device 100 adjusts the communication signal according to the determined communication status (operation S730). In detail, if the source device 100 determines the communication status between the source device 100 and the sink device 200 is normal using the HDCP communication result transmitted from the sink device 200, the source device 100 maintains the current communication status and communicates with the sink device 200.

However, if it is determined that the communication status between the source device 100 and the sink device 200 is a failure status, the source device 100 adjusts the communication signal. At this time, a method for adjusting the communication signal may include at least one of a method for adjusting a waveform of the communication signal, a method for adjusting a bit depth of the picture data, and a method for adjusting an output resolution of the picture data as described above with reference to FIG. 6. Since the above-described order is an order to minimize the impact on the image quality of the contents, the communication signal can be adjusted according to the above-described order.

While not restricted thereto, an exemplary embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an exemplary embodiment may be written as a computer program transmitted over a computer-readable transmission medium, such as a carrier wave, and received and implemented in general-use or special-purpose digital computers that execute the programs. Moreover, one or more components of the above-described devices can include a processor or microprocessor executing a computer program stored in a computer-readable medium.

While exemplary embodiments of the present disclosure have been described, additional variations and modifications of the exemplary embodiments may occur to those skilled in the art once they learn of the basic inventive concepts. Therefore, it is intended that the appended claims shall be construed to include both the above operation embodiments and all such variations and modifications that fall within the spirit and scope of the inventive concepts.

What is claimed is:

1. A communication method of a source device that provides contents to a sink device, the communication method comprising:

transmitting a communication signal including a High-bandwidth Digital Content Protection (HDCP) signal to the sink device;

receiving a response signal in response to the communication signal from the sink device;

determining a first communication status with the sink device by comparing the response signal with a decoding value obtained by decoding in the source device; and adjusting the communication signal according to the determined first communication status, wherein the response signal comprises a decoded value of the HDCP signal transmitted to the sink device, and wherein the adjusting the communication signal comprises adjusting a waveform of the communication signal according to the determined first communication status by at least one of heightening a peak to peak of the communication signal, decreasing a rising time and a falling time of the communication signal, and increasing or decreasing jitter for optimization of electrical characteristics of the communication signal.

2. The communication method of claim 1, wherein:

the determining the first communication status with the sink device comprises comparing a first decoding value of the HDCP signal transmitted from the sink device with a second decoding value generated in the source device to determine the first communication status with the sink device; and the adjusting the waveform of the communication signal comprises, if the first decoding value of the HDCP signal transmitted from the sink device and the second decoding value generated in the source device are not equivalent according to the comparing, adjusting the communication signal.

3. The communication method of claim 2, further comprising:
transmitting the adjusted communication signal to the sink device and determining a second communication status with the sink device using a second HDCP communication result transmitted from the sink device in response to the adjusted communication signal; and
if it is determined that the second HDCP communication result is a failure result, changing a frequency of the communication signal.

4. The communication method of claim 1, further comprising:
transmitting the communication signal having a changed frequency to the sink device and determining a third communication status with the sink device using a third HDCP communication result transmitted from the sink device in response to the communication signal having the changed frequency; and
if it is determined that the third HDCP communication result is a failure result, decreasing an output resolution of picture data included in the contents.

5. The communication method of claim 1, further comprising reducing a bit depth of picture data included in the contents and decreasing an output resolution of the picture data included in the contents.

6. The communication method of claim 1, wherein the communication signal comprises a Transition Minimized Differential Signaling (TMDS) signal.

7. The communication method of claim 1, wherein the transmitting the communication signal comprises transmitting the communication signal using a High Definition Multimedia Interface (HDMI) or a Digital Visual Interface (DVI).

8. A source device that provides contents to a sink device, the source device comprising:
a communicating portion which communicates with the sink device; and
a controller which controls the communicating portion to transmit a communication signal including a High-bandwidth Digital Content Protection (HDCP) signal to the sink device, receives a response signal in response to the communication signal from the sink device, determines a first communication status with the sink device by comparing the response signal with a decoding value obtained by decoding in the source device, and adjusts the communication signal according to the determined communication status,
wherein the response signal comprises a decoded value of the HDCP signal transmitted to the sink device, and
wherein the controller adjusts a waveform of the communication signal according to the determined communication status so that at least one of a peak to peak of the communication signal is heightened, a rising time and a falling time of the communication signal are decreased, and jitter is increased or decreased for optimization of electrical characteristics of the communication signal.

9. The source device of claim 8, wherein the controller compares a first decoding value of the HDCP signal transmitted from the sink device with a second decoding value generated in the source device to determine the first communication status with the sink device, and, if the first decoding value of the HDCP signal transmitted from the sink device and the second decoding value generated in the source device are not equivalent according to the determining, adjusts the waveform of the communication signal.

10. The source device of claim 9, wherein the controller controls the communicating portion to transmit the adjusted communication signal to the sink device, determines a second communication status with the sink device using a second HDCP communication result transmitted from the sink device in response to the adjusted communication signal, and, if it is determined that the second HDCP communication result is a failure result, changes a frequency of the communication signal.

11. The source device of claim 8, wherein the controller reduces a bit depth of picture data included in the contents and decreases an output resolution of the picture data included in the contents.

12. The source device of claim 8, wherein the communication signal comprises a Transition Minimized Differential Signaling (TMDS) signal.

13. The source device of claim 8, wherein the communicating portion uses a High Definition Multimedia Interface (HDMI) or a Digital Visual Interface (DVI) to transmit the communication signal.

14. A communication method of a sink device that receives contents from a source device, the communication method comprising:
receiving, from the source device, a communication signal including a High-bandwidth Digital Content Protection (HDCP) signal;
decoding the HDCP signal included in the received communication signal to obtain a decoding value;
transmitting, to the source device, an HDCP communication result;
receiving an adjusted communication signal comprising a waveform that is adjusted by at least one of heightening a peak to peak of the communication signal, decreasing a rising time and a falling time of the communication signal, and increasing or decreasing jitter for optimization of electrical characteristics of the communication signal; and
receiving the contents,
wherein the HDCP communication result comprises the decoding value of the HDCP signal generated in the sink device.

* * * * *